US012650773B2

(12) United States Patent
Ramachandra et al.

(10) Patent No.: US 12,650,773 B2
(45) Date of Patent: Jun. 9, 2026

(54) INPUT/OUTPUT OPERATIONS PER SECOND (IOPS) RECOMMENDATION FOR DATA VOLUMES

(71) Applicant: VMware LLC, Palo Alto, CA (US)

(72) Inventors: Nitin Ramachandra, Bengaluru (IN); Priyank Agarwal, Bengaluru (IN); Suchitha Shet, Bengaluru (IN); Prasanna Ganapathi, Bengaluru (IN); Ravi Kasha, Farooqnagar (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/886,679

(22) Filed: Sep. 16, 2024

(65) Prior Publication Data

US 2025/0110645 A1     Apr. 3, 2025

(51) Int. Cl.
G06F 3/06 (2006.01)
(52) U.S. Cl.
CPC .......... G06F 3/0613 (2013.01); G06F 3/0665 (2013.01); G06F 3/0673 (2013.01)
(58) Field of Classification Search
CPC ..... G06F 3/0613; G06F 3/0665; G06F 3/0673
See application file for complete search history.

(56) References Cited

U.S. PATENT DOCUMENTS

| | | | |
|---|---|---|---|
| 10,404,613 B1 * | 9/2019 | Brooker | .................. H04L 47/70 |
| 2020/0034057 A1 | 1/2020 | Srinivasan et al. | |
| 2021/0314393 A1 | 10/2021 | Cady | |

OTHER PUBLICATIONS

Anonymous, Amazon Elastic Compute Cloud User Guide for Linux, API Version Apr. 15, 2015, pp. 391-696.
Lu, T. et al., IOTune: A G-states Driver for Elastic Performance of Block Storage, arXiv:1705.03591, 2017, pp. 1-15.
European Patent Office, Extended Search Report, Application No. 24203999.8, Feb. 10, 2025, 13 pages.

* cited by examiner

*Primary Examiner* — Eric Cardwell
(74) *Attorney, Agent, or Firm* — Quarles & Brady LLP

(57)     ABSTRACT
An example method for provisioning data volume for a virtual compute instance may include receiving a request to provision a data volume for a virtual compute instance. The request may specify a size of the data volume, a type of the data volume, and a first input/output operations per second (IOPS) value for the data volume. Further, the method may include determining a recommended IOPS value for the data volume by applying a logic to the specified size, the specified type, and the first IOPS value. Furthermore, the method may include provisioning the data volume for the virtual compute instance with the specified size, the specified type, and the recommended IOPS value.

17 Claims, 6 Drawing Sheets

RECEIVE A REQUEST TO PROVISION A DATA VOLUME FOR A VIRTUAL COMPUTE INSTANCE ⌐302

DETERMINE A RECOMMENDED IOPS VALUE FOR THE DATA VOLUME BY APPLYING A LOGIC TO THE SPECIFIED SIZE, THE SPECIFIED TYPE, AND THE FIRST IOPS VALUE ⌐304

PROVISION THE DATA VOLUME FOR THE VIRTUAL COMPUTE INSTANCE WITH THE SPECIFIED SIZE, THE SPECIFIED TYPE, AND THE RECOMMENDED IOPS VALUE ⌐306

300

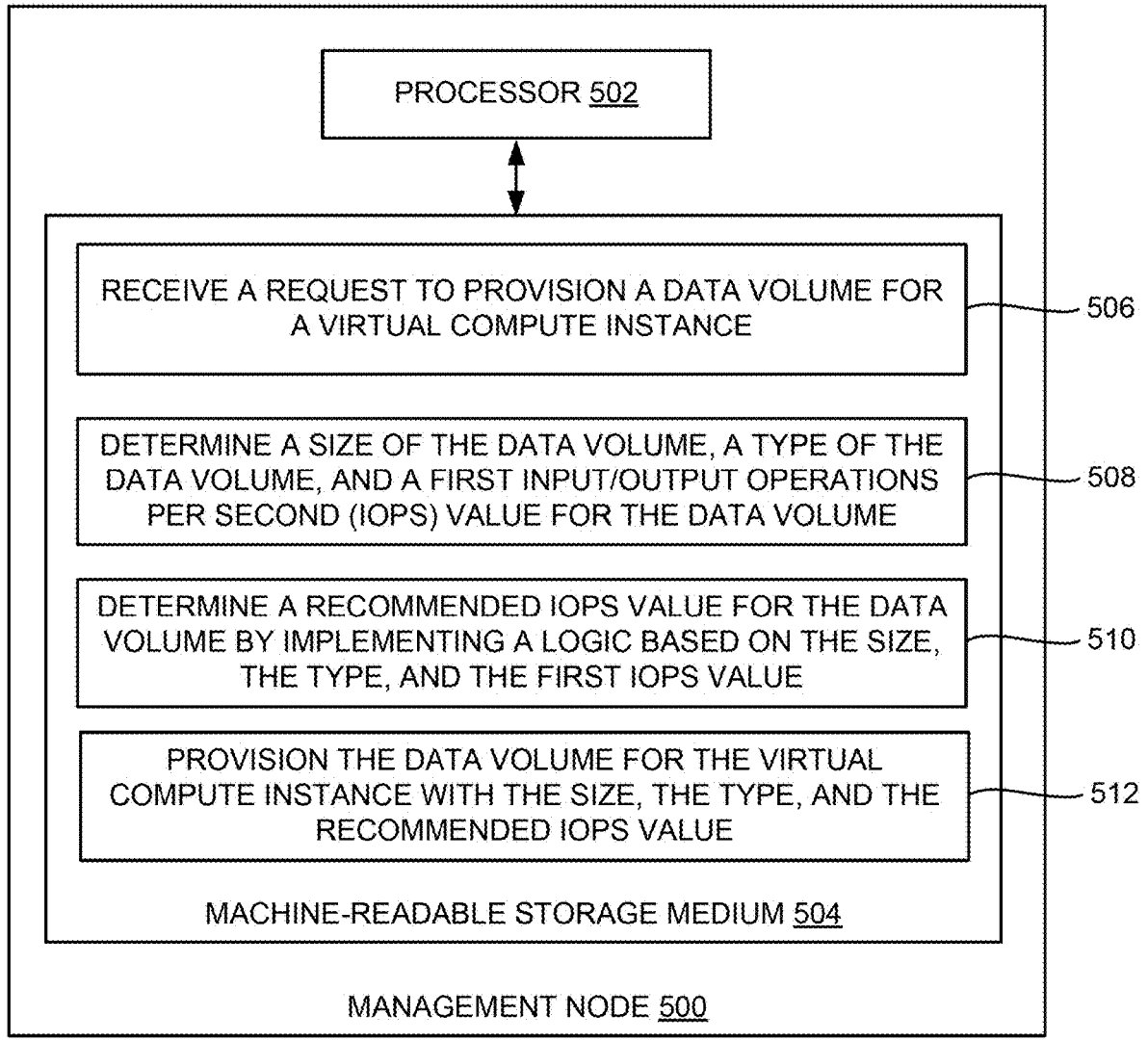

PROCESSOR 502

RECEIVE A REQUEST TO PROVISION A DATA VOLUME FOR A VIRTUAL COMPUTE INSTANCE — 506

DETERMINE A SIZE OF THE DATA VOLUME, A TYPE OF THE DATA VOLUME, AND A FIRST INPUT/OUTPUT OPERATIONS PER SECOND (IOPS) VALUE FOR THE DATA VOLUME — 508

DETERMINE A RECOMMENDED IOPS VALUE FOR THE DATA VOLUME BY IMPLEMENTING A LOGIC BASED ON THE SIZE, THE TYPE, AND THE FIRST IOPS VALUE — 510

PROVISION THE DATA VOLUME FOR THE VIRTUAL COMPUTE INSTANCE WITH THE SIZE, THE TYPE, AND THE RECOMMENDED IOPS VALUE — 512

MACHINE-READABLE STORAGE MEDIUM 504

MANAGEMENT NODE 500

FIG. 5

INPUT/OUTPUT OPERATIONS PER SECOND (IOPS) RECOMMENDATION FOR DATA VOLUMES

RELATED APPLICATIONS

This application claims priority to Indian Application No. 202341066034 filed Oct. 2, 2023, by VMware LLC, entitled "INPUT/OUTPUT OPERATIONS PER SECOND (IOPS) RECOMMENDATION FOR DATA VOLUMES," which is hereby incorporated by reference in their entirety for all purposes.

TECHNICAL FIELD

The present disclosure relates to computing environments, and more particularly to methods, techniques, and systems for provisioning data volume for virtual compute instances in the computing environment.

BACKGROUND

Cloud computing platforms (e.g., Amazon Web Services (AWS), Microsoft Azure, Google Cloud Platform (GCP), and the like) may provide different wide-ranging cloud infrastructure as a service (IaaS) services, which ranges from virtual compute, storage, and networking to complete computing stacks. Further, cloud storage optimization may involve selecting, configuring, and maintaining cloud infrastructure and computing resources. For example, Amazon Elastic Block Store (EBS) is a block storage service provided by Amazon Web Services (AWS) that is designed to provide persistent block-level storage for Amazon Elastic Compute Cloud (EC2) instances. Further, the EBS volumes are virtual hard drives that can be attached to EC2 instances to provide persistent storage that can survive instance termination. When determining a storage solution for data, it is important to know factors associated with the storage (e.g., EBS volumes) of such data, such as the number of input/output operations per second (IOPS).

BRIEF DESCRIPTION OF THE DRAWINGS

FIG. 5 is a block diagram of an example management node including non-transitory computer-readable storage medium storing instructions to provision data volume for virtual compute instances.

Figure 1:
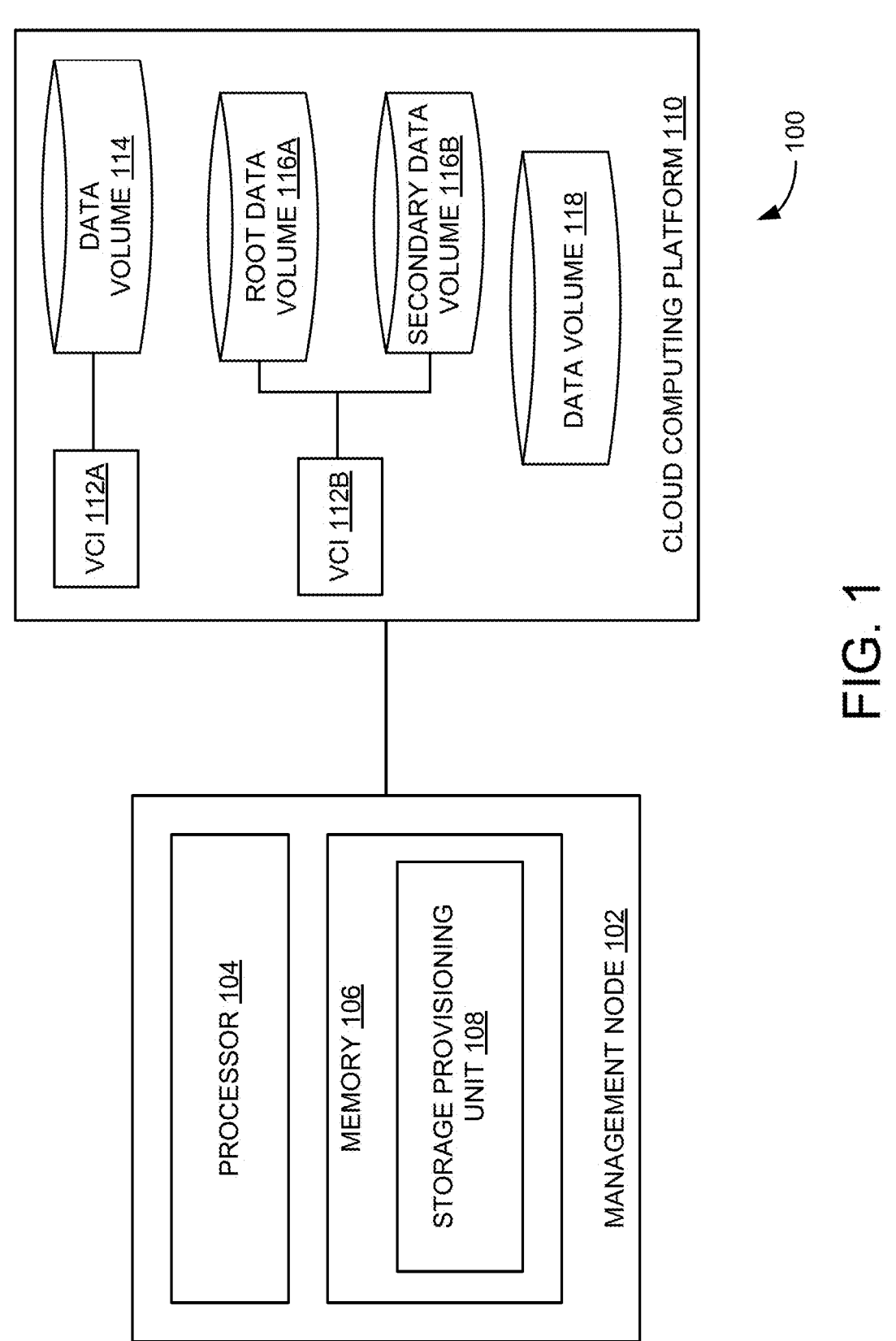
FIG. 1 is a block diagram of an example computing environment, including a management node to provision data volume for a virtual compute instance in a cloud computing platform.

The drawings described herein are for illustrative purposes and are not intended to limit the scope of the present subject matter in any way.

DETAILED DESCRIPTION

Examples described herein may provide an enhanced computer-based and/or network-based method, technique, and system to determine a recommend input/output operations per second (IOPS) value for provisioning data volumes for virtual compute instances in a computing environment. An overview of the cloud computing environment, existing methods to provision data volume for virtual compute instances in the computing environment, and drawbacks associated with the existing methods is provided below.

Computing environment may be a virtual computing environment (e.g., a cloud computing environment, a virtualized environment, and the like). The virtual computing environment may be a pool or collection of cloud infrastructure resources designed for enterprise needs. The resources may be a processor (e.g., central processing unit (CPU)), memory (e.g., random-access memory (RAM)), storage (e.g., disk space), and networking (e.g., bandwidth). Further, the virtual computing environment may be a virtual representation of the physical data center, complete with servers, storage clusters, and networking components, all of which may reside in virtual space being hosted by one or more physical data centers. Example virtual computing environment may include different endpoints (e.g., physical computers, virtual machines, and/or containers). For example, the computing environment may include multiple application hosts (i.e., physical computers) executing different virtual computing instances (e.g., referred to as workloads) such as virtual machines, containers, and the like running therein. Example endpoints may execute different types of applications.

Virtualization of computing infrastructures is a fundamental process that powers cloud computing in order to provide services to the customers requesting services on a cloud platform through a portal. For example, cloud computing platforms (e.g., Amazon Web Services (AWS), Microsoft Azure, Google Cloud Platform (GCP), and the like) may provide different wide-ranging cloud IaaS services, which ranges from virtual compute, storage, and networking to complete computing stacks.

In some examples, Amazon Elastic Block Store (EBS) is a block storage service provided by Amazon Web Services (AWS) that is designed to provide persistent block-level storage for Amazon Elastic Compute Cloud (EC2) instances. EBS volumes are virtual hard drives that can be attached to EC2 instances to provide persistent storage that can survive instance termination. There are several types of EBS volumes available, including General Purpose (SSD) volumes, Provisioned IOPS (SSD) volumes, Cold HDD volumes, Throughput Optimized HDD volumes, and io2 (SSD) volumes. Each type may be optimized for specific use cases and workloads, such as database storage, big data analytics, and machine learning.

For example, the General Purpose (SSD) volumes are the default EBS volume type and are suitable for a broad range of workloads. They offer a balance of price and performance and provide up to 16,000 IOPS and 250 MiB/s of throughput per volume. The Provisioned IOPS (SSD) volumes are designed for high-performance databases and other I/O-intensive workloads. They provide up to 64,000 IOPS and 1,000 MiB/s of throughput per volume, with the ability to provision the exact amount of IOPS needed for a specific workload. The Cold HDD volumes are designed for infrequent access workloads that require lower-cost storage. They provide low-cost block storage with a throughput performance of up to 250 MiB/s per volume and an access time of 16.5 ms. The Throughput Optimized HDD volumes are designed for significantly large, sequential workloads such as big data and log processing. They provide low-cost block storage with throughput performance of up to 500

MiB/s per volume and an access time of 10 ms. The io2 (SSD) volumes are the newest generation of EBS volumes and offer significantly highest performance and durability. They provide up to 64,000 IOPS, 1,000 MiB/s of throughput per volume, and a 99.999% durability guarantee. The io2 volumes are designed for mission-critical applications and workloads that require the highest levels of performance and availability.

In some example scenarios, significantly large enterprise customers are transitioning from gp2 to using gp3 EBS volume type by default for various reasons such as for better price performance, and IOPS or throughput scale capability independent of capacity. Also, in several Amazon Machine Images (AMIs) that are used for deployments, gp3 EBS volume is the default volume type and currently, there is no support for adding gp3 or io2 EBS volume types in storage profiles nor through using 'Volume (Classic)' resource type in the VCT or through any day 2 actions. Hence, these deficiencies are perceived as an infrastructure automation platform's (e.g., Aria Automation Cloud Assembly) inability to keep up with native AWS features and it is important to provide these additional functionalities to encourage continued usage and reduce the need to keep using workarounds as a solution.

When determining a storage solution for data, it is important to know factors associated with the storage (e.g., EBS volumes) of such data, such as the number of input/output operations per second (IOPS). The existing backend logic that allows the IOPS (with a minimum of 50 IOPS for every EBS volume irrespective of the type and requested size) fails to meet the requirement set by the AWS for some specific types, leading to several combinations of failures during the provisioning of EBS volumes. At the core of the issue, the value of IOPS may need special consideration since it needs to be dynamically re-adjusted considering not only the minimum disk size (or boot disk size of the associated AMIs) but also the Max IOPS per GB recommendations for each volume type so that the final provisioned EBS volume is both cost-effective and high performing that ensures that there are no additional costs for usage beyond what was initially intended or budgeted for.

Examples described herein may provide a management node including a storage provisioning unit to provision data volume for virtual compute instances. During operation, the storage provisioning unit may receive a request to provision a data volume for a virtual compute instance. The request may specify a size of the data volume, a type of the data volume, and a first input/output operations per second (IOPS) value for the data volume. Further, the storage provisioning unit may determine a recommended IOPS value for the data volume by applying a logic to the specified size, the specified type, and the first IOPS value. Furthermore, the storage provisioning unit may provision the data volume for the virtual compute instance with the specified size, the specified type, and the recommended IOPS value.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Referring now to the figures, FIG. 1 is a block diagram of an example computing environment 100, including a management node 102 to provision data volume for a virtual compute instance (e.g., VCI 112A and VCI 112B) in a cloud computing platform 110. Example computing environment 100 may be a cloud computing environment (e.g., a virtualized cloud computing environment). For example, the cloud computing environment may be enabled by vSphere®, VMware's cloud computing virtualization platform. The cloud computing environment may include one or more computing platforms that support the creation, deployment, and management of virtual machine-based cloud applications or services or programs. An application, also referred to as an application program, may be a computer software package that performs a specific function directly for an end user or, in some cases, for another application. Examples of applications may include MySQL, Tomcat, Apache, word processors, database programs, web browsers, development tools, image editors, communication platforms, and the like.

Example computing environment may include a cloud computing platform 110. For example, cloud computing platform 110 may refer to an operating system and hardware of a server in an Internet-based data center. It allows software and hardware products to co-exist remotely and at scale. Further, there are different types of cloud computing platforms to meet varying needs of users such as a public cloud platform, a private cloud platform, and a hybrid cloud platform. The public cloud platform is a third-party provider that delivers computing resources over the Internet such as Amazon Web Services (AWS), Google Cloud Platform, Alibaba, Microsoft Azure, IBM Bluemix, or the like. The private cloud platform may be exclusive to a single organization (e.g., in an on-site data center or hosted by a third-party service provider). The hybrid cloud platform may be a combination of the public and private cloud platforms. For example, data and applications move seamlessly between the public and private cloud platforms. Based on a volume type, cloud computing platform 110 may control block storage volume or block storage volumes performance. For example, cloud computing platform 110 may include Amazon web services (AWS) and/or Amazon Elastic Block Storage (EBS). In other examples, the public cloud computing platform may include other cloud-based services and/or sub-services.

Further, cloud computing platform 110 may include a plurality of virtual compute instances 112A and 112B. In an example, virtual computing instances 112A and 112B may be virtual machines (VMs) executing on a host. In this example, the host may be a physical computer. In another example, virtual computing instances 112A and 112B may be containers executing on the host. In this example, the host may be a virtual machine or a physical computer. The physical computer may be a hardware-based device (e.g., a personal computer, a laptop, or the like) including an operating system (OS). A virtual machine may operate with its own guest OS on the physical computer using resources of the physical computer virtualized by virtualization software (e.g., a hypervisor, a virtual machine monitor, and the like). A container may be a data computer node that runs on top of a host operating system without the need for the hypervisor or separate operating system. Further, each of virtual computing instances 112A and 112B may be associated with a root data volume, a secondary data volume, or a combination thereof. In the example shown in FIG. 1, virtual computing instance 112A is associated with a data volume 114, which can be a root data volume or a secondary data volume. Virtual computing instance 112B is associated with a root data volume (e.g., root data volume 116A that includes an image used to boot virtual compute instance 112B) and a secondary data volume 116B. Furthermore, cloud computing platform 110 may include a standalone data volume 118, which can be associated with any of the virtual compute instances at a later stage.

For example, an infrastructure automation platform such as Aria Automation Cloud Assembly may enable users to configure storage profiles with a new Elastic Block Storage (EBS) volume type and deploy a VCT that includes the EBS volume either as standalone or as boot volumes attached to the virtual compute instance (e.g., EC2 instance) or as an additional disk to the EC2 instance. The EBS volume is a durable, block-level storage device that you can attach to virtual computing instances. After a volume is attached to a virtual computing instance, it can be used as a physical hard drive. EBS volumes are flexible. For current-generation volumes attached to current-generation instance types, it is possible to dynamically increase size, modify the provisioned IOPS capacity, and change volume type on live production volumes.

Further, the EBS volumes can be used as primary storage for data that requires frequent updates, such as the system drive for an instance or storage for a database application. The EBS volumes can also be used for throughput-intensive applications that perform continuous disk scans. In some examples, multiple EBS volumes can be attached to a single instance. In other examples, depending on the volume and instance types, Multi-Attach can be used to mount a volume to multiple instances at the same time.

As shown in FIG. 1, cloud computing environment 100 may include a management node 102. In an example, management node 102 may include a processor 104. Processor 104 may refer to, for example, a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. Processor 104 may, for example, include single or multiple cores on a chip, multiple cores across multiple chips, multiple cores across multiple devices, or suitable combinations thereof. Processor 104 may be functional to fetch, decode, and execute instructions as described herein. Further, management node 102 includes memory 106 coupled to processor 104. Memory 106 may include storage provisioning unit 108. Furthermore, processor 104 may execute storage provisioning unit 108 stored in memory 106.

During operation, storage provisioning unit 108 may receive a request to provision a data volume (e.g., 114) for a virtual compute instance (e.g., 112A). An example request may specify a size of the data volume, a type of the data volume, and a first input/output operations per second (IOPS) value for the data volume. For example, the data volume may include the EBS volume.

In an example, storage provisioning unit 108 may receive the request including a storage profile specifying the size of the data volume, the type of the data volume, and the first IOPS value for the data volume. The storage profile may refer to a way of categorizing storage based on the type/capability of the storage. The storage profile may include disk customizations, and a means to identify the type of storage by capability tags. The storage profile is a governance layer built in the Aria Automation and any provisioning activity should always abide by the thresholds mentioned in the governance layer. In another example, storage provisioning unit 108 may enable, via a user interface, a user to input data specifying the size of the data volume, the type of the data volume, and the first IOPS value for the data volume as part of the request to provision the data volume. In other examples, image and flavor mapping may be defined to enable to quickly set up mappings that apply to multiple tenants. The image mapping groups a set of predefined target storage specifications for a specific cloud account/region.

In an example, storage provisioning unit 108 may receive the request to provision a boot volume that stores data to boot the virtual compute instance, a secondary data volume that can be attached to the virtual compute instance, or both. Further, storage provisioning unit 108 may determine a recommended IOPS value for the data volume by applying a logic to the specified size, the specified type, and the first IOPS value. In an example, storage provisioning unit 108 may compute a second IOPS value by multiplying the specified size with a maximum IOPS value per unit of the data volume corresponding to the specified type. Further, storage provisioning unit 108 may select a minimum value from the first IOPS value and the second IOPS value as a third IOPS value. Furthermore, storage provisioning unit 108 may determine whether the third IOPS value is within a range of IOPS values associated with the specified type. Further, storage provisioning unit 108 may determine the recommended IOPS value for the data volume based on whether the third IOPS value is within the range of IOPS values.

When the third IOPS value is less than a minimum value of the range of IOPS values, storage provisioning unit 108 may adjust the third IOPS value to the minimum value of the range of IOPS values. When the third IOPS value is greater than a maximum value of the range of IOPS values, storage provisioning unit 108 may adjust the third IOPS value to the maximum value of the range of IOPS values.

Furthermore, storage provisioning unit 108 may provision the data volume for the virtual compute instance with the specified size, the specified type, and the recommended IOPS value. In some examples, the functionalities described in FIG. 1, in relation to instructions to implement functions of storage provisioning unit 108 and any additional instructions described herein in relation to the storage medium, may be implemented as engines or modules including any combination of hardware and programming to implement the functionalities of the modules or engines described herein. The functions of storage provisioning unit 108 may also be implemented by respective processors. In examples described herein, each processor may include, for example, one processor or multiple processors included in a single device or distributed across multiple devices.

Further, the cloud computing environment illustrated in FIG. 1 is shown purely for purposes of illustration and is not intended to be in any way inclusive or limiting to the embodiments that are described herein. For example, a typical cloud computing environment would include many more virtual computing instances, which may be distributed over multiple hosts and data centers, which might include many other types of devices, such as switches, power supplies, cooling systems, environmental controls, and the like, which are not illustrated herein. It will be apparent to one of ordinary skill in the art that the example shown in FIG. 1 as well as all other figures in this disclosure have been simplified for ease of understanding and are not intended to be exhaustive or limiting to the scope of the idea.

Figure 2:
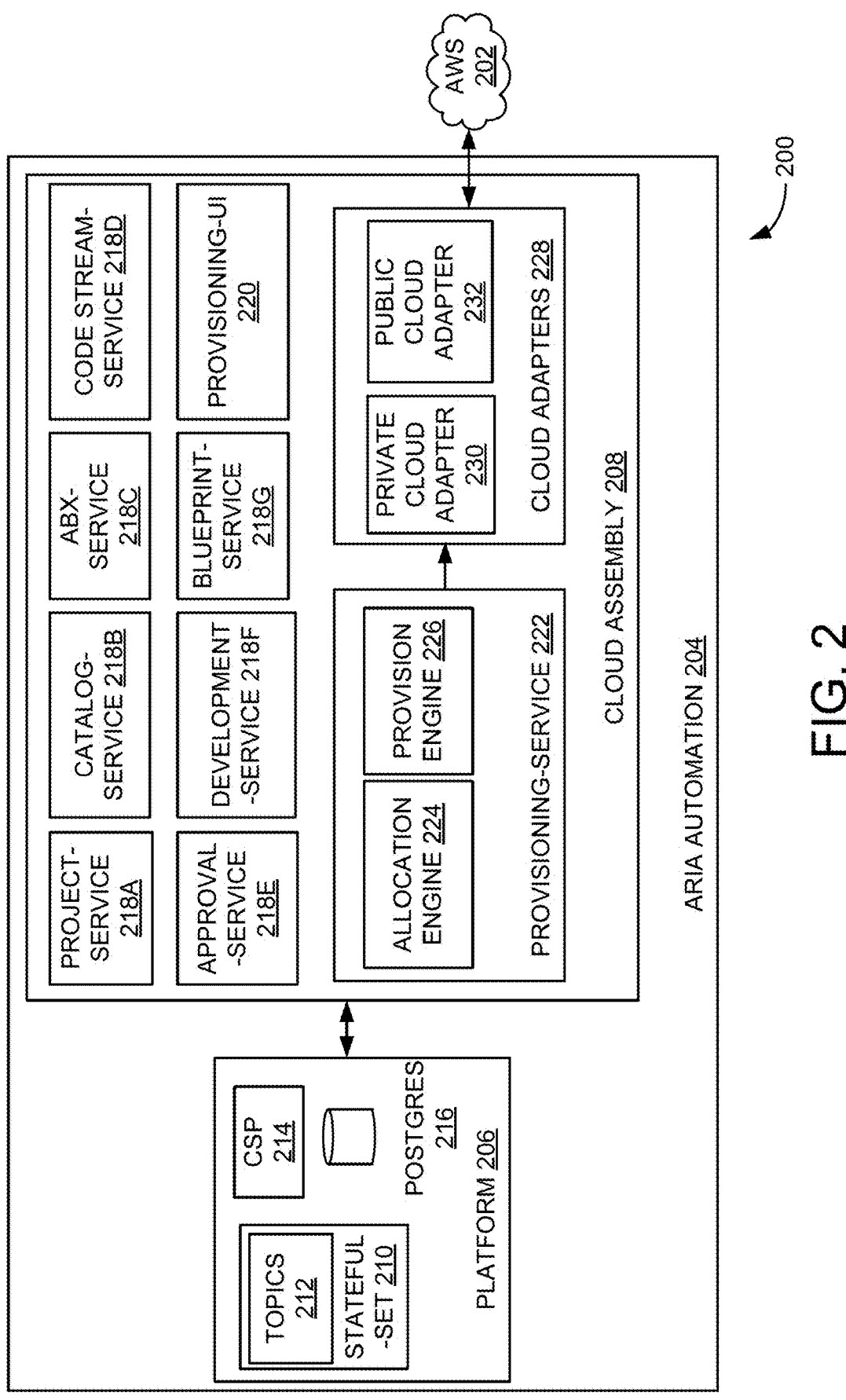
FIG. 2 is a block diagram of another example computing environment, depicting various components of an infrastructure automation platform (e.g., VMware Aria Automation) to provision data volume for a virtual compute instance in a cloud computing platform (Amazon Web Services (AWS))

FIG. 2 is a block diagram of another example computing environment 200, depicting various components of an infrastructure automation platform 204 (e.g., VMware Aria Automation) to provision data volume for a virtual compute instance in a cloud computing platform 202 (Amazon Web Services (AWS)). Example computing environment 200 may include AWS 202, which may provide storage and compute on demand services, named as Elastic Compute Cloud (EC2) and Simple Storage Service (S3). Further, EC2 may offer customizable virtual hardware to the end user which can be utilized as a base infrastructure for deploying computing systems on the cloud.

In some examples, Amazon Elastic Block Store (EBS) is a block storage service provided by AWS 202 that is designed to provide persistent block-level storage for EC2 instances. EBS volumes are virtual hard drives that can be attached to EC2 instances to provide persistent storage that can survive instance termination. There are several types of EBS volumes available, including General Purpose (SSD) volumes, Provisioned IOPS (SSD) volumes, Cold HDD volumes, Throughput Optimized HDD volumes, and io2 (SSD) volumes. The General Purpose (SSD) volumes are the default EBS volume type and are suitable for a broad range of workloads. They offer a balance of price and performance and provide up to 16,000 IOPS and 250 MiB/s of throughput per volume. The Provisioned IOPS (SSD) volumes are designed for high-performance databases and other I/O-intensive workloads. They provide up to 64,000 IOPS and 1,000 MiB/s of throughput per volume, with the ability to provision the exact amount of IOPS needed for a specific workload. The Cold HDD volumes are designed for infrequent access workloads that require lower-cost storage. They provide low-cost block storage with a throughput performance of up to 250 MiB/s per volume and an access time of 16.5 ms. Further, the Throughput Optimized HDD volumes are designed for large, sequential workloads such as big data and log processing. They provide low-cost block storage with throughput performance of up to 500 MiB/s per volume and an access time of 10 ms. The io2 (SSD) volumes are the newest generation of EBS volumes and offer the highest performance and durability. They provide up to 64,000 IOPS, 1,000 MiB/s of throughput per volume, and a 99.999% durability guarantee. The io2 volumes are designed for mission-critical applications and workloads that require the highest levels of performance and availability.

As shown in FIG. 2, Aria Automation 204 includes a platform 206 and a cloud assembly 208. Platform 206 includes a stateful set 210 having topics 212, a cloud services platform (CSP) 214, and a database (e.g., Postgres 216). For example, a user may be invited or otherwise granted access to Aria Automation 204 for Secure Clouds deployment through federated identity, managed in CSP 214. From CSP 214 dashboard, a user may be provided access to the organization, or one or more projects. Postgres 216 may be a primary data store of Aria Automation 204.

Further, cloud assembly 208 may include a plurality of components having different topics such as project service 218A, catalog service 218B, ABX service 218C, code stream service 218D, approval service 218E, deployment service 218F, and blueprint service 218G with which Aria Automation 204 makes entry into job queue table that eventually triggers a business rule for that topic. The business rule on the job queue table may handle all the topics in a switch-case and perform further processing of the topic by invoking further methods from different scripts.

Aria Automation 204 may use various services 218A-218G to deploy and operate your apps, infrastructure, and platform services across private, hybrid, and multiple clouds from a single platform with a common data model. For example, catalog service 218B may be used to display a list of catalog items entitled to the user. Catalog items are imported templates that you can request for deployment.

Project service 218A may be used to empower teams to take an active role in managing their own security insights and resolutions. ABX service 218C may be used to provide serverless function capability built into Cloud Assembly. Code Stream service 218D may be used to simplify the ability to build, test, and deploy your applications, and increase productivity as source code is released from the development repository, through testing, to production. Approval service 218E may be used to provide a level of governance that can be added to exercise control over deployment and day 2 action requests before they are run. deployment service 218F. Further, cloud assembly 208 may include a provisioning user interface 220.

Furthermore, cloud assembly 208 may include a provisioning service 222 and cloud adaptors 228. In an example, provisioning service 222 may include an allocation engine 224 and a provision engine 226. Cloud adapters 228 may include a private cloud 230 and a public cloud 232.

In an example, upon creating an account in VMware vRealize Automation (vRA), an option may be provided to provision EBS volume. vRA may allow the user to create and manage private cloud without the need for complex manual processes. During operation, provisioning service 222 may receive a request to provision data volume. In an example, the request may include a storage profile specifying the size of the data volume, the type of the data volume, and the first IOPS value for the storage volume. For example, provisioning user interface 220 may enable the user to input data specifying the size of the data volume, the type of the data volume, and the first IOPS value for the data volume as part of the request to provision the data volume. In another example, provisioning service 222 may receive the request to provision a boot volume including data to boot a virtual compute instance in AWS 202, a secondary data volume that can be attached to the virtual compute instance, or both. The boot volume may be provisioned during provisioning of the virtual compute instance in AWS 202 and the secondary data volume is a standalone data volume that can be provisioned and attached to the virtual compute instance in AWS 202 after provisioning the virtual compute instance.

Upon receiving the request, allocation engine 224 may retrieve configurations such as network profiles, image mappings, storage profiles, flavour mappings, cluster plans, and/or the time to create reservations to provision the data volume. For example, allocation engine 224 may perform a usual constraint to capability filter matching by regressing on the defined storage profiles. Further, allocation engine 224 may reserve the quotas against the data collected Compute Host (e.g., a data center). Furthermore, allocation engine 224 may create/update required Disk states with the selected EBS volume type, the disk size, and the recommended IOPS value.

Further during operation, provision engine 226 may communicate with cloud adapters 228 for provisioning the data volume. Furthermore, cloud adapters 228 may communicate with AWS 202 to provide the provisioned data volume. In this example, persisted data from the storage profile against the required Disk state sets the baseline configuration of values as intended by the Cloud Admin of Aria Automation 204. Based on this configuration, the provisioning flow selects the required task service to handle the request. i.e., AWS Disk Service for stand-alone EBS volume or for any additional volumes of an EC2 instance and AWS Instance Lifecycle Strategy for EC2 instances with implicit boot volumes. Further, irrespective of the task services handling the request, during the Create/Update of the Device block mapping, the flow reaches the newly introduced algorithm which will vet the value in the storage profile. Hence using the recommendations from AWS, during the reconciliation:

The IOPS value will be first minimized such that the value will be boxed to the tune of the maximum IOPS per GB per the volume type multiplied by the disk size. This will help the IOPS value to be stretched so that the user gets a high-performing EBS volume with great I/O and high throughput without exceeding the cost threshold. Hence the maximum IOPS per GB or the initial multiplier is, a. 50 for io1 EBS volume.

b. 500 for io2 EBS volume (This value will also work seamlessly for io2 block-express-based provisioning for special use cases in AWS GovCloud (US))

c. 500 for gp3 EBS volume.

Since sometimes the adjusted IOPS might fall outside the range and hence the value be again re-adjusted to the MIN/MAX overall value per EBS volume type on a case-by-case basis. Hence the IOPS will be further boxed between, a. 100-64000 for io1 EBS volume.

b. 100-256000 for io2 EBS volume.

c. 3000-16000 for gp3 EBS volume.

In other examples, the maximum IOPS per GB or the initial multiplier can also be defined as a ratio of IOPS:GIB. Consider an example of gp3 EBS volume. Further consider that the request to provision a data volume for a virtual compute instance specifies a size of the data volume as 16 GB, a type of the data volume as gp3 EBS volume, and a first IOPS value for the data volume as 9000. In this example, a second IOPS value may be computed by multiplying the specified size (16 GB) with a maximum IOPS value (i.e., 500) per unit of the data volume corresponding to gp3 EBS volume. In this example, the second IOPS value is 8000. Further, a minimum value from the first IOPS value (i.e., 9000) and the second IOPS value (i.e., 8000) is selected as a third IOPS value. In this example, the third IOPS value is 8000. In this example, the third IOPS value (i.e., 8000) is within a range of IOPS values (i.e., 3000-16000) associated with gp3 EBS volume. In this example, the third IOPS value is considered as the recommended IOPS value.

In another example, consider that the third IOPS value is computed as 2000. In this example, the third IOPS value (i.e., 2000) is less than the minimum value (i.e., 3000) of the range of IOPS values. In this example, the third IOPS value is adjusted to the minimum value (i.e., 3000) of the range of IOPS values.

In yet another example, consider that the third IOPS value is computed as 18000. In this example, the third IOPS value (i.e., 18000) is greater than the maximum value (i.e., 16000) of the range of IOPS values. In this example, the third IOPS value is adjusted to the maximum value (i.e., 16000) of the range of IOPS values. Further, the data volume can be provisioned for the virtual compute instance with the recommended IOPS value.

Figure 3:
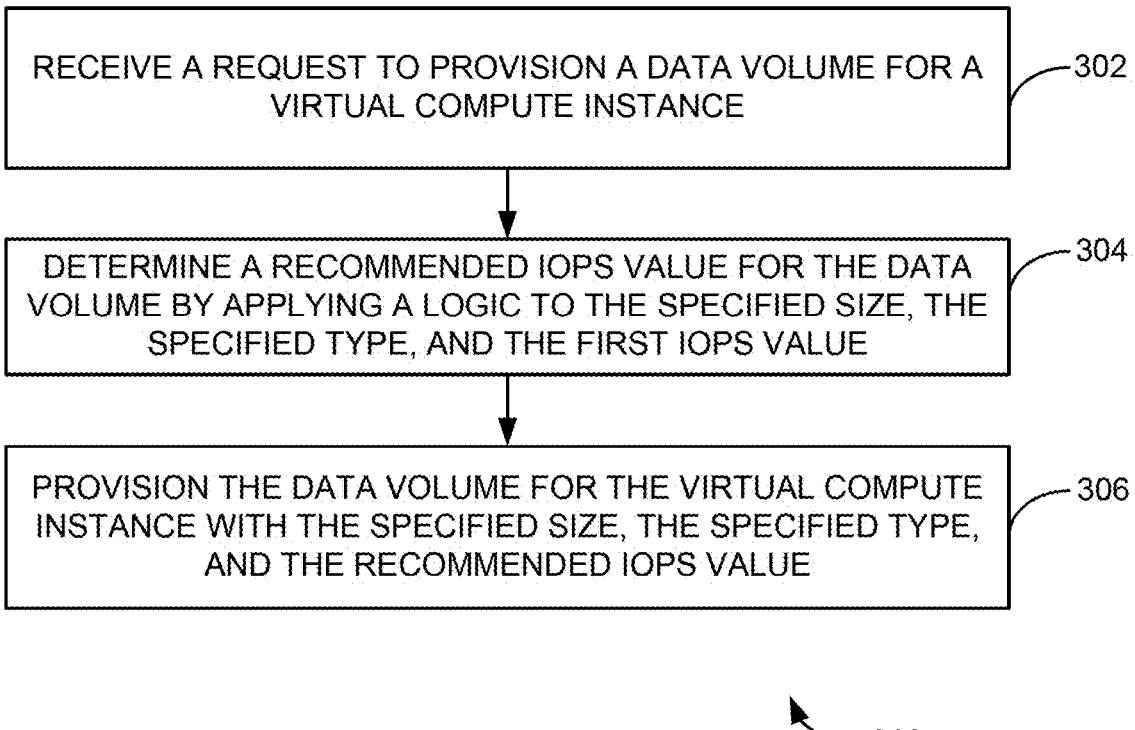
FIG. 3 is a flow diagram illustrating an example method for provisioning data volume for virtual compute instances.

FIG. 3 is a flow diagram illustrating an example method 300 for provisioning data volume for virtual compute instances. Example method 300 depicted in FIG. 3 represents generalized illustrations, and other processes may be added, or existing processes may be removed, modified, or rearranged without departing from the scope and spirit of the present application. In addition, method 300 may represent instructions stored on a computer-readable storage medium that, when executed, may cause a processor to respond, to perform actions, to change states, and/or to make decisions. Alternatively, method 300 may represent functions and/or actions performed by functionally equivalent circuits like analog circuits, digital signal processing circuits, application specific integrated circuits (ASICs), or other hardware components associated with the system. Furthermore, the flow chart is not intended to limit the implementation of the present application, but the flow chart illustrates functional information to design/fabricate circuits, generate computer-readable instructions, or use a combination of hardware and computer-readable instructions to perform the illustrated processes.

At 302, a request to provision a data volume for a virtual compute instance may be received. For example, the data volume may include an Elastic Block Store (EBS) volume. An example request may specify a size of the data volume, a type of the data volume, and a first input/output operations per second (IOPS) value for the data volume. In an example, receiving the request may include receiving the request including a storage profile specifying the size of the data volume, the type of the data volume, and the first IOPS value for the storage volume. In another example, receiving the request may include enabling, via a user interface, a user to input data specifying the size of the data volume, the type of the data volume, and the first IOPS value for the data volume as part of the request to provision the data volume.

In an example, receiving the request to provision the data volume may include receiving the request to provision a boot volume including data to boot the virtual compute instance, a secondary data volume that can be attached to the virtual compute instance, or both. The boot volume may be provisioned during provisioning of the virtual compute instance. The secondary data volume may be a standalone data volume that can be provisioned and attached to the virtual compute instance after provisioning the virtual compute instance.

At 304, a recommended IOPS value for the data volume may be determined by applying a logic to the specified size, the specified type, and the first IOPS value. In an example, determining the recommended IOPS value for the data volume by applying the logic may include computing a second IOPS value by multiplying the specified size with a maximum IOPS value per unit of the data volume corresponding to the specified type. Further, a minimum value from the first IOPS value and the second IOPS value may be selected as a third IOPS value. Furthermore, a check may be made to determine whether the third IOPS value is within a range of IOPS values associated with the specified type. Further, the recommended IOPS value for the data volume may be determined based on whether the third IOPS value is within the range of IOPS values.

In an example, when the third IOPS value is less than a minimum value of the range of IOPS values, the recommended IOPS value may be determined by adjusting the third IOPS value to the minimum value of the range of IOPS values. In another example, when the third IOPS value is greater than a maximum value of the range of IOPS values, the recommended IOPS value may be determined by adjusting the third IOPS value to the maximum value of the range of IOPS values. At 306, the data volume for the virtual compute instance may be provisioned with the specified size, the specified type, and the recommended IOPS value.

Figure 4A:
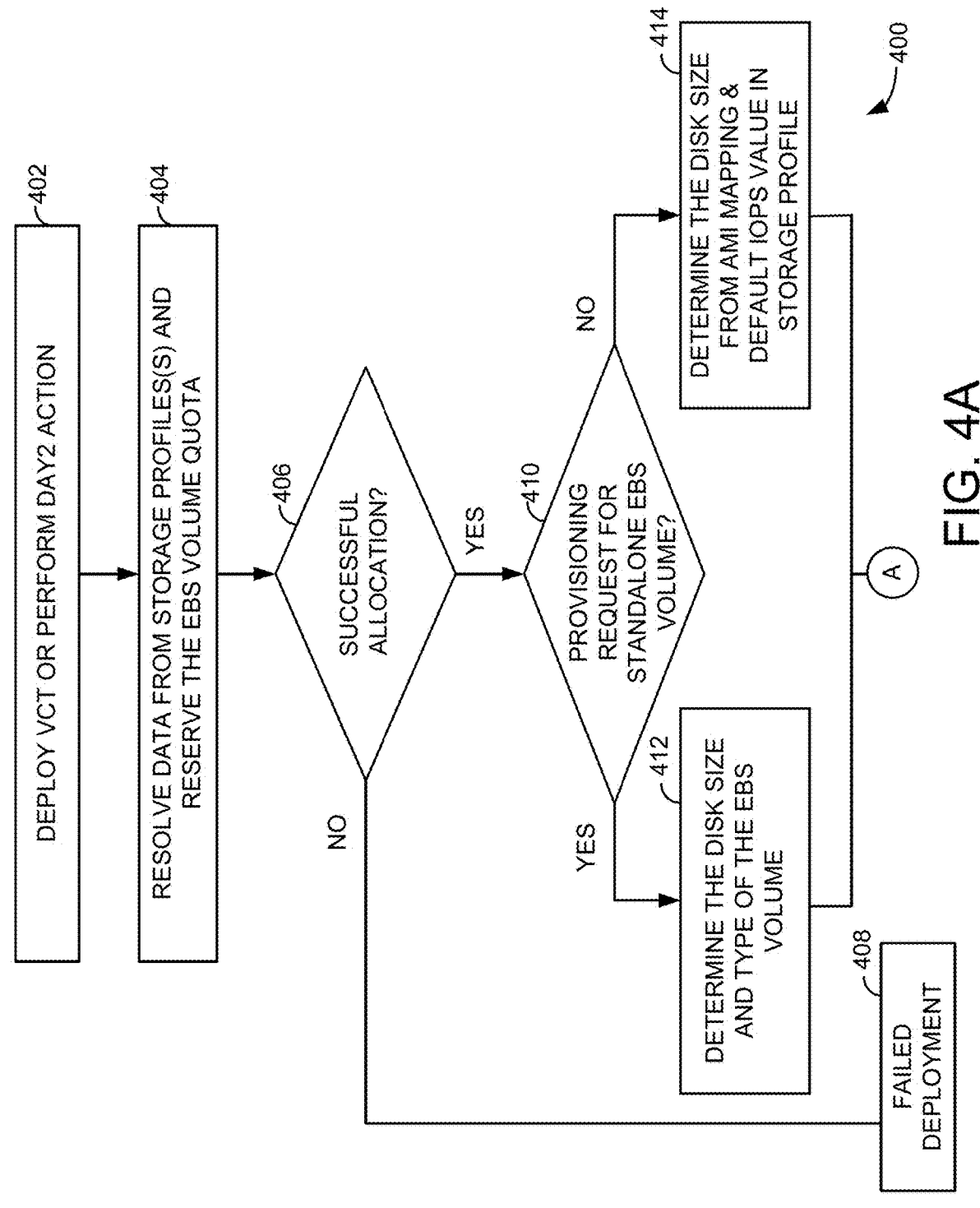
FIGS. 4A and 4B are flow diagrams illustrating another example method for provisioning data volume in a cloud service.
Figure 4B:
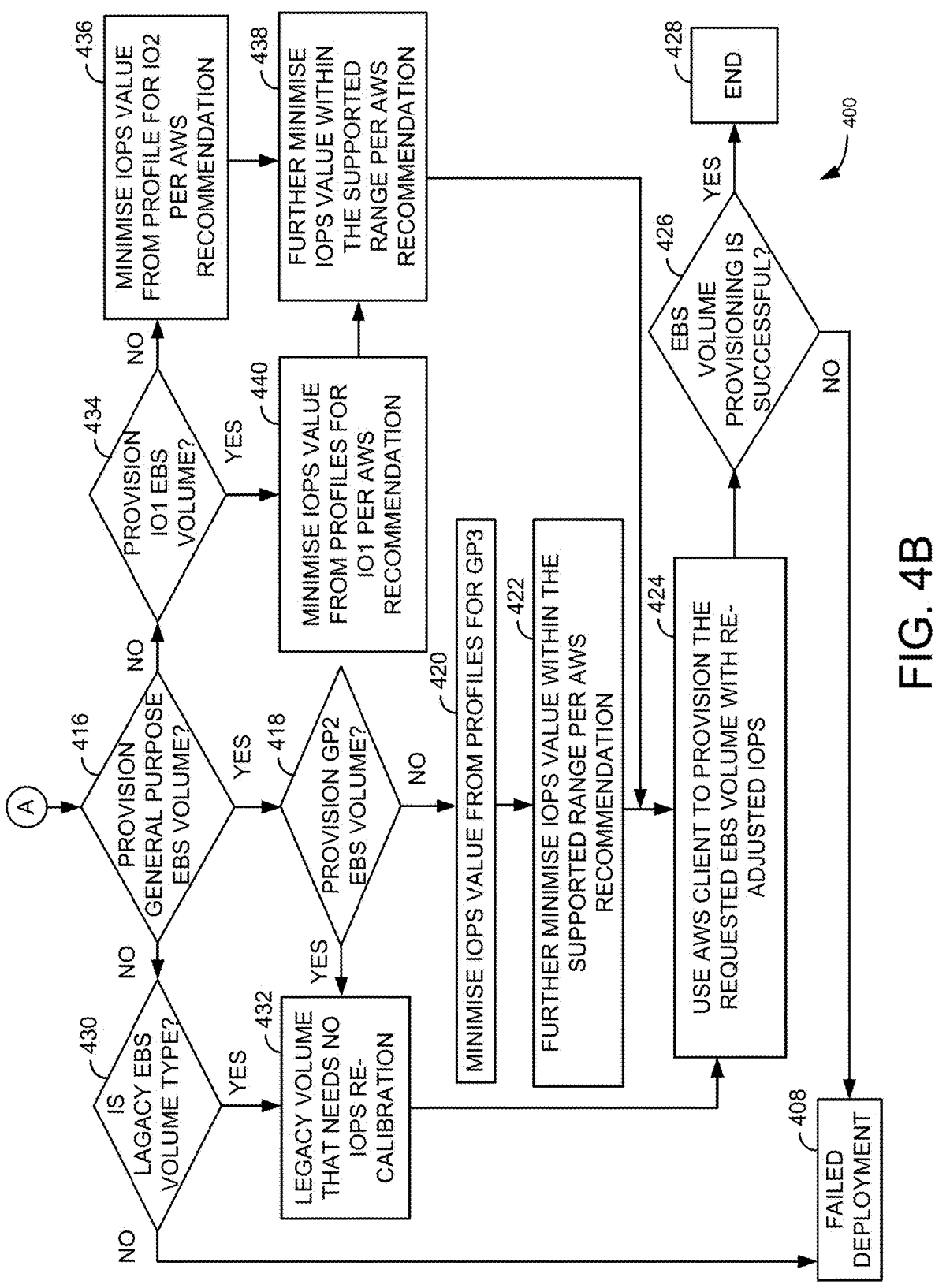

FIGS. 4A and 4B are flow diagrams illustrating another example method for provisioning data volume in a cloud service. At 402, a cloud template or blueprint may be deployed or a deployed cloud template or a deployed blueprint may be considered to perform day 2 operations. For example, the VCT including the EBS volume is a standalone construct and/or attached to EC2 instance using the valid constraints matching the defined capabilities in storage profiles.

At 404, allocation of the data volume may be performed. For example, data from the storage profiles may be resolved and EBS volume quota may be reserved. Post allocation, at 406, a check may be made to determine whether the allocation is successful. When the allocation is unsuccessful, the deployment may be considered as failed, at 408. When the allocation is successful, a check may be made to determine whether the provisioning request is for standalone EBS volume, at 410. When the provisioning request is for standalone EBS volume, at 412, the size and the type of the EBS volume may be determined. In another example, when the provisioning request is not for standalone EBS volume, at 414, the disk size may be determined from Amazon Machine Image (AMI) mapping and default IOPS (e.g., a unit of measure representing input/output operations per second) value in the storage profile.

At 416, a check may be made to determine whether the request is for provisioning a general purpose EBS volume. When the general purpose EBS volume (e.g., gp2 or gp3) may have to be provisioned, a check may be made to determine whether gp2 EBS volume may have to be provisioned, at 418. When the provision request does not include gp2 EBS volume, it is considered that gp3 EBS volume may have to be provisioned. In this example, at 420, the IOPS value from the storage profile for gp3 can be minimized as shown in equation 1.

$$IOPS=MIN(DISK\ SIZE*MAX\ IOPS\ PER\ GiB\ for \\ GP3,REQUESTED\ IOPS) \tag{1}$$

At 422, the IOPS value is further minimized within a supported range per AWS recommendation. For example, the supported range for gp3 in AWS is 300-16000. At 424, the requested EBS volume may be provisioned with readjusted IOPS value for the usage of the user or client. At 426, a check may be made to determine whether EBS volume provisioning is successful. When the provisioning is successful, process 400 may be terminated, at 428. When the provisioning is unsuccessful, the deployment may be considered as failed, at 408.

When the request is for provisioning EBS volume includes other than the general purpose EBS volume, a check may be made to determine whether legacy EBS volume type may have to be provisioned, at 430. When the legacy EBS volume type may not have to be provisioned, the deployment may be considered as failed, at 408. When the legacy EBS volume type may have to be provisioned, legacy volumes such as sc1, HDD and the like or gp2 EBS volume types may not require IOPS recalibration, at 432. Further, step 424 may be executed.

When the request is for provisioning EBS volume other than the general purpose EBS volume, a check may be made to determine whether io1 or io2 volume (e.g., SSD) may have to be provisioned. At 434, a check may be made to determine whether io1 EBS volume may have to be provisioned. When the io1 EBS volume may not have to be provisioned, then io2 EBS volume may have to be provisioned. In this example, at 436, the IOPS value from the storage profile for io2 per AWS may be minimized as shown in equation 2.

$$IOPS=MIN(DISK\ SIZE*MAX\ IOPS\ PER\ GiB\ for \\ IO2,REQUESTED\_IOPS) \tag{2}$$

At 438, the IOPS value may be further minimized within a supported range per AWS recommendation. For example, the supported range for io2 in AWS is 100-256000. Further, step 424 may be executed. When the io1 EBS volume may have to be provisioned, at 440, the IOPS value from the profile for io1 per AWS may be minimized as shown in equation 3.

$$IOPS=MIN(DISK\ SIZE*MAX\ IOPS\ PER\ GiB\ IO1, \\ REQUESTED\ IOPS) \tag{3}$$

At 438, the IOPS value may be further minimized within a supported range per AWS recommendation. For example, the supported range for io1 in AWS is 100-64000. Further, step 424 may be executed.

FIG. 5 is a block diagram of an example management node 500 including non-transitory computer-readable storage medium 504 storing instructions to provision data volume for virtual compute instances. Management node 500 may include a processor 502 and computer-readable storage medium 504 communicatively coupled through a system bus. Processor 502 may be any type of central processing unit (CPU), microprocessor, or processing logic that interprets and executes computer-readable instructions stored in computer-readable storage medium 504. Computer-readable storage medium 504 may be a random-access memory (RAM) or another type of dynamic storage device that may store information and computer-readable instructions that may be executed by processor 502. For example, computer-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, computer-readable storage medium 504 may be a non-transitory computer-readable medium. In an example, computer-readable storage medium 504 may be remote but accessible to management node 500.

Computer-readable storage medium 504 may store instructions 506, 508, 510, and 512. Instructions 506 may be executed by processor 502 to receive a request to provision a data volume for a virtual compute instance. In an example, instructions to receive the request may include instructions to receive the request including a storage profile specifying the size of the data volume, the type of the data volume, and the first IOPS value for the data volume. In another example, instructions to receive the request may include instructions to enable, via a user interface, a user to input data specifying the size of the data volume, the type of the data volume, and the first IOPS value for the data volume as part of the request to provision the data volume. In an example, instructions to receive the request to provision the data volume may include instructions to receive the request to provision a boot volume including data to boot the virtual compute instance, a secondary data volume that can be attached to the virtual compute instance, or both.

Based on the request, instructions 508 may be executed by processor 502 to determine a size of the data volume, a type of the data volume, and a first input/output operations per second (IOPS) value for the data volume.

Instructions 516 may be executed by processor 502 to determine a recommended IOPS value for the data volume by implementing a logic based on the size, the type, and the first IOPS value. In an example, instructions 516 to determine the recommended IOPS value for the data volume by applying the logic may include instructions to compute a second IOPS value by multiplying the specified size with a maximum IOPS value per unit of the data volume corresponding to the specified type. Further, a minimum value from the first IOPS value and the second IOPS value may be selected as a third IOPS value. Furthermore, a check may be made to determine whether the third IOPS value is within a range of IOPS values associated with the specified type. Further, the recommended IOPS value for the data volume may be determined based on whether the third IOPS value is within the range of IOPS values.

In an example, when the third IOPS value is less than a minimum value of the range of IOPS values, instructions to determine the recommended IOPS value may include instructions to adjust the third IOPS value to the minimum value of the range of IOPS values. In another example, when the third IOPS value is greater than a maximum value of the range of IOPS values, instructions to determine the recommended IOPS value may include instructions to adjust the third IOPS value to the maximum value of the range of IOPS values.

Instructions 516 may be executed by processor 502 to provision the data volume for the virtual compute instance with the size, the type, and the recommended IOPS value.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not be meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A method comprising:
    receiving a request to provision a data volume for a virtual compute instance, the request specifying a size of the data volume, a type of the data volume, and a first input/output operations per second (IOPS) value for the data volume;
    determining a recommended IOPS value for the data volume by applying a logic to the specified size, the specified type, and the first IOPS value; and
    provisioning the data volume for the virtual compute instance with the specified size, the specified type, and the recommended IOPS value;
    wherein determining the recommended IOPS value for the data volume by applying the logic comprises:
    computing a second IOPS value by multiplying the specified size with a maximum IOPS value per unit of the data volume corresponding to the specified type;
    selecting a minimum value from the first IOPS value and the second IOPS value as a third IOPS value;

determine whether the third IOPS value is within a range of IOPS values associated with the specified type; and
    determining the recommended IOPS value for the data volume based on whether the third IOPS value is within the range of IOPS values.

2. The method of claim 1, wherein determining the recommended IOPS value comprises:
    when the third IOPS value is less than a minimum value of the range of IOPS values, adjusting the third IOPS value to the minimum value of the range of IOPS values; and
    when the third IOPS value is greater than a maximum value of the range of IOPS values, adjusting the third IOPS value to the maximum value of the range of IOPS values.

3. The method of claim 1, wherein the data volume comprises an Elastic Block Store (EBS) volume.

4. The method of claim 1, wherein receiving the request comprises:
    receiving the request comprising a storage profile specifying the size of the data volume, the type of the data volume, and the first IOPS value for a storage volume.

5. The method of claim 1, wherein receiving the request comprises:
    enabling, via a user interface, a user to input data specifying the size of the data volume, the type of the data volume, and the first IOPS value for the data volume as part of the request to provision the data volume.

6. The method of claim 1, wherein receiving the request to provision the data volume comprises:
    receiving the request to provision a boot volume comprising data to boot the virtual compute instance, a secondary data volume that can be attached to the virtual compute instance, or both, wherein the boot volume is provisioned during provisioning of the virtual compute instance, and wherein the secondary data volume is a standalone data volume that can be provisioned and attached to the virtual compute instance after provisioning the virtual compute instance.

7. A management node comprising:
    a processor;
    memory coupled to the processor, wherein the memory comprises a storage provisioning unit to:
    receive a request to provision a data volume for a virtual compute instance, the request specifying a size of the data volume, a type of the data volume, and a first input/output operations per second (IOPS) value for the data volume;
    determine a recommended IOPS value for the data volume by applying a logic to the specified size, the specified type, and the first IOPS value;
    compute a second IOPS value by multiplying the specified size with a maximum IOPS value per unit of the data volume corresponding to the specified type;
    select a minimum value from the first IOPS value and the second IOPS value as a third IOPS value;
    determine whether the third IOPS value is within a range of IOPS values associated with the specified type; and
    determine the recommended IOPS value for the data volume based on whether the third IOPS value is within the range of IOPS values; and
    provision the data volume for the virtual compute instance with the specified size, the specified type, and the recommended IOPS value.

8. The management node of claim 7, wherein the storage provisioning unit is to:

when the third IOPS value is less than a minimum value of the range of IOPS values, adjust the third IOPS value to the minimum value of the range of IOPS values; and when the third IOPS value is greater than a maximum value of the range of IOPS values, adjust the third IOPS value to the maximum value of the range of IOPS values.

9. The management node of claim 7, wherein the data volume comprises an Elastic Block Store (EBS) volume.

10. The management node of claim 7, wherein the storage provisioning unit is to:

receive the request comprising a storage profile specifying the size of the data volume, the type of the data volume, and the first IOPS value for the data volume.

11. The management node of claim 7, wherein the storage provisioning unit is to:

enable, via a user interface, a user to input data specifying the size of the data volume, the type of the data volume, and the first IOPS value for the data volume as part of the request to provision the data volume.

12. The management node of claim 7, wherein the storage provisioning unit is to:

receive the request to provision a boot volume comprising data to boot the virtual compute instance, a secondary data volume that can be attached to the virtual compute instance, or both.

13. A non-transitory computer readable storage medium comprising instructions executable by a processor of a management node to:

receive a request to provision a data volume for a virtual compute instance;

based on the request, determine a size of the data volume, a type of the data volume, and a first input/output operations per second (IOPS) value for the data volume;

determine a recommended IOPS value for the data volume by implementing a logic based on the size, the type, and the first IOPS value; and provision the data volume for the virtual compute instance with the size, the type, and the recommended IOPS value;

wherein instructions to determine the recommended IOPS value for the data volume by applying the logic comprise instructions to:

compute a second IOPS value by multiplying the specified size with a maximum IOPS value per unit of the data volume corresponding to the specified type;

select a minimum value from the first IOPS value and the second IOPS value as a third IOPS value;

determine whether the third IOPS value is within a range of IOPS values associated with the specified type; and determine the recommended IOPS value for the data volume based on whether the third IOPS value is within the range of IOPS values.

14. The non-transitory computer readable storage medium of claim 13, wherein instructions to determine the recommended IOPS value comprise instructions to:

when the third IOPS value is less than a minimum value of the range of IOPS values, adjust the third IOPS value to the minimum value of the range of IOPS values; and when the third IOPS value is greater than a maximum value of the range of IOPS values, adjust the third IOPS value to the maximum value of the range of IOPS values.

15. The non-transitory computer readable storage medium of claim 13, wherein instructions to receive the request comprise instructions to:

receive the request comprising a storage profile specifying the size of the data volume, the type of the data volume, and the first IOPS value for the data volume.

16. The non-transitory computer readable storage medium of claim 13, wherein instructions to receive the request comprise instructions to:

enable, via a user interface, a user to input data specifying the size of the data volume, the type of the data volume, and the first IOPS value for the data volume as part of the request to provision the data volume.

17. The non-transitory computer readable storage medium of claim 13, wherein instructions to receive the request to provision the data volume comprise instructions to:

receive the request to provision a boot volume comprising data to boot the virtual compute instance, a secondary data volume that can be attached to the virtual compute instance, or both.

*     *     *     *     *